United States Patent
Ray

(10) Patent No.: US 7,675,414 B2
(45) Date of Patent: Mar. 9, 2010

(54) METHODS AND APPARATUS FOR AN ENVIRONMENTAL AND BEHAVIORAL ADAPTIVE WIRELESS COMMUNICATION DEVICE

(75) Inventor: Rajarshi Ray, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 11/627,293

(22) Filed: Jan. 25, 2007

(65) Prior Publication Data

US 2008/0036591 A1 Feb. 14, 2008

Related U.S. Application Data

(60) Provisional application No. 60/837,156, filed on Aug. 10, 2006.

(51) Int. Cl.
G08B 1/08 (2006.01)
(52) U.S. Cl. .................. 340/539.26; 340/506; 340/517; 340/521; 340/539.1; 340/539.22; 340/825.36; 340/825.49
(58) Field of Classification Search .................. 340/506, 340/517, 521, 539.1, 539.22, 539.26, 825.36, 340/825.49
See application file for complete search history.

(56) References Cited

U.S. PATENT DOCUMENTS 6,225,901 B1 * 5/2001 Kail, IV ................ 340/539.11

2004/0259536 A1 12/2004 Keskar et al.

FOREIGN PATENT DOCUMENTS

| EP | 1185058 | 3/2002 |
|----|---------|--------|
| EP | 1530383 | 5/2005 |
| EP | 1631050 | 3/2006 |
| WO | 0076177 | 12/2000 |
| WO | 2005101176 | 10/2005 |
| WO | 2006057770 | 6/2006 |

OTHER PUBLICATIONS

International Search Report, PCT/US07/075410, International Search Authority, European Patent Office, May 8, 2008.
Written Opinion, PCT/US07/075410, International Search Authority, European Patent Office, May 8, 2008.

* cited by examiner

*Primary Examiner*—Daryl Pope
(74) *Attorney, Agent, or Firm*—Abdollah Katbab

(57) ABSTRACT

Methods, devices, apparatus and systems are provided for adaptation of a wireless communication device based on current environmental conditions, historical environmental condition patterns and/or historical usage patterns. In this regard, the device senses such environmental conditions as light, sound, motion, temperature and the like and, automatically or at user discretion, adjusts functionality on the device that is affected by these conditions. Additionally, by determining environmental and usage patterns the device can adapt to the patterns by providing certain functionality and/or applications to the user at prescribed times of the day, week, month, etc. By being able to automatically adapt the functionality of a wireless communication device, the user of such a device experiences greater ease in using the device and an overall heightened user experience.

73 Claims, 7 Drawing Sheets

METHODS AND APPARATUS FOR AN ENVIRONMENTAL AND BEHAVIORAL ADAPTIVE WIRELESS COMMUNICATION DEVICE

CLAIM OF PRIORITY UNDER 35 U.S.C. §119

The present application for patent claims priority to Provisional Application No. 60/837,156 entitled "System and Method for Adaptive Communication Device" filed Aug. 10, 2006 and assigned to the assignee hereof and hereby expressly incorporated by reference herein.

BACKGROUND

1. Field

The disclosed aspects relate to wireless communication devices, and more particularly, to methods and apparatus for adapting the wireless communication device to environmental conditions and user behavior.

2. Background

Wireless communication devices have become a prevalent means by which majorities of people worldwide have come to communicate. Wireless communication devices have become smaller and more powerful in order to meet consumer needs and to improve portability and convenience. The increase in processing power in wireless communication devices such as cellular telephones has lead to an increase in demands on wireless network transmission systems. As wireless communication device capabilities expand, adaptive capabilities of such wireless communication devices become possible.

One problem that persists in wireless communication devices is the inability to hear, either the ring tone or caller, or detect a vibration in a noisy or distracting environment. Currently, in order for the device to overcome the noise/distraction problem the device user must manually adjust the volume of ring tone, the intensity of the vibration, the frequency of the ring tone/vibration and/or the microphone volume. Even if a user is cognizant of the current or impending noisy or distracting environment, the manual adjustment process is generally inconvenient and time-consuming to the user, often requiring the user to recall and provide various inputs to a system configuration application in order to adjust the ring tone volume/frequency, the vibration intensity/frequency and/or the microphone volume. In other instances, noisy or distracting environments may occur randomly without providing the user an opportunity to manually adjust the features within the device.

In the same regard, other features and functions on the communication device may be affected by environmental conditions. For example, displays on such devices have become the rule rather than the exception and the ability to properly view the display is dependent on the amount of ambient light. Typically, the display is difficult, if not impossible, to view in poorly lit environments or overly bright outdoor environments. When the device encounters such environments the user must make manual adjustments to the display features, such as display brightness, display contrast and the like, in order to be able to view the displayed information. Similar to the hearing and/or detecting problems related to noisy or distracting environment, the poorly lit or overly bright environment poses similar problems. Even if a user is aware of the current or impending lighting environment, the manual adjustment process is generally inconvenient, time-consuming and requires the user to recall and provide various inputs to a system configuration application in order to adjust the contrast and brightness. In other instances, poorly lit or over-bright environments may occur randomly without providing the user an opportunity to manually adjust the features within the device.

Additionally, as wireless communication devices provide increasingly more functionality, users of such devices rely on the device around the clock to carry out a myriad of everyday functions. For example, a user may daily rely on an alarm application to wake up in the morning, habitually use a news application to receive weather, sports, news and stock market information at routine time periods through out the day, launch a music application to listen to a specific genre of music at a prescribed time or make certain calls to certain individuals at the prescribed times throughout a day or a week. All of these functions and applications require the user to continuously, and in most instances redundantly, interface with the device. In many instances, continuous and redundant interface with the device adds inefficiency to the overall user experience.

Therefore a need exists to develop systems, methods and devices that sense and automatically, or with user acquiescence, adapt to environmental conditions and/or user usage patterns. Such a device will improve the user experience by eliminating the need to manually change device features based on current environmental conditions and/or redundantly perform functions, applications and the like that are undertaken by the user on a regular, daily, or weekly basis. The desired systems, methods and devices provider for a "smarter" wireless communication device that is able to automatically adapt to environmental conditions and user behavior patterns.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented infra.

Thus, methods, computer program products, processors and apparatus presented herein provide for the adaptation of a wireless communication device based on current environmental conditions, historical environmental patterns and/or historical usage patterns. The described aspects provide for a wireless communication that lends itself to an improved user experience by eliminating the need to manually change device features based on current environmental conditions or a historical pattern of environmental conditions. In addition, the described aspects add to the user experience by eliminating the need to redundantly perform functions, applications and the like based on a usage pattern determined on a regular, daily, or weekly basis.

In one aspect, a method is provided for adapting a wireless communication device. The method includes detecting one or more environmental conditions at a wireless communication device, determining if the one or more detected environmental conditions warrant adjustment to one or more wireless communication device functions and determining an adjustment action for the one or more wireless device functions if the detected environmental condition is determined to warrant adjustment. The adjustment action may be defined as a function parameter alteration, function activation and/or a function deactivation. The method may further include adjusting the one or more wireless communication device functions based on the determined adjustment action. Detecting environmental conditions may include, but is not limited to, detecting ambient light intensity, detecting ambient noise level, detecting motion of the wireless device, detecting ambient temperature and the like. The wireless communication functions that may be adjusted based on detected environmental conditions include, but are not limited to, display brightness, display contrast, ring tone volume, ring tone frequency, vibration intensity, vibration frequency, speaker volume, a voice-activated dialer function, a power-down function, a limited-use function and the like. Determining if the detected environmental condition warrants adjustment further may include comparing the detected environmental conditions to one or more predetermined thresholds, implementing a predetermined algorithm, implementing a heuristic simulation or any other feasible manner for determining if adjustment is warranted. Further, the adjustment to the device functions may occur automatically based on user pre-configuration or the user may be prompted for acceptance of any adjustment prior to implementing the adjustment.

A related aspect is defined by at least one processor configured to perform the actions of detecting one or more environmental conditions at a wireless communication device, determining if the one or more detected environmental conditions warrant adjustment to one or more wireless communication device parameters and determining an adjustment action for the one or more wireless device parameters if the detected environmental condition is determined to warrant adjustment.

A further related aspect is defined by a computer program product comprising a computer readable medium. The computer readable medium includes a first set of codes for causing a computer to detect one or more environmental conditions at a wireless communication device, a second set of codes for causing the computer to determine if the one or more detected environmental conditions warrant adjustment to one or more wireless communication device parameters, and a third set of codes for causing the computer to determine an adjustment action for the one or more wireless device parameters if the detected environmental condition is determined to warrant adjustment.

Another aspect is provided for by a wireless communication device. The device includes a computer platform including a processor and a memory, at least one sensor device in communication with the processor and operable for sensing an environmental condition and a function adjustment module stored in the memory and executable by the processor. The function adjustment module includes adjustment determination logic operable for determining if the sensed environmental condition warrants adjustment to one or more wireless communication device functions and determining an adjustment action for the one or more wireless device functions if the detected environmental condition is determined to warrant adjustment and adjustment logic operable for adjusting the one or more wireless communication device functions based on the determined adjustment action. The sensor device may include, but is not limited to, a photo sensor operable for sensing light intensity, an audio level sensor operable for sensing noise level, an accelerometer operable for sensing motion in the wireless communication device, a temperature sensor operable for sensing temperature and the like. The adjustment determination logic may further include one or more predetermined thresholds that are used to compare the sensed environmental condition to determine if adjustment is warranted, one or more predetermined algorithms that implement to determine if adjustment is warranted, and/or one or more heuristic simulations that are implement to determine if adjustment is warranted.

A related aspect is defined by a wireless communication device that includes means for detecting one or more environmental conditions at the wireless communication device, means for determining if the one or more detected environmental conditions warrant adjustment to one or more wireless communication device parameters, and means for determining an adjustment action for the one or more wireless device parameters if the detected environmental condition is determined to warrant adjustment.

Yet another aspect is provided by a method for adapting a wireless communication device. The method includes logging user actions and temporal information associated with the user actions, determining a usage pattern based on the logged user actions and the temporal information and determining at least one function adjustment based on the usage pattern. The method may further include adjusting at least one function of the wireless communication device based on the corresponding at least one function adjustment. The logging of user actions may include, but is not limited to, user actions such as communication calls made, communication calls received, applications accessed on the wireless device and functionality implemented on the wireless device. In addition, the method may include logging geographic location information associated the user actions, such that the determination of a usage pattern is based on the logged user actions, the temporal information and the geographic location information. Function adjustment may include, but is not limited to, function/application parameter alteration, function/application activation and function/application deactivation. The determination of a usage pattern may be based on comparison of the logged usage actions and temporal information to predetermined usage pattern thresholds, implementing a heuristic simulation model and/or implementing a predetermined algorithm. Further, the adjustment to the device functions may occur automatically based on user pre-configuration or the user may be prompted for acceptance of any adjustment prior to implementing the adjustment.

A related aspect is provided by at least one processor configured to perform the actions of logging user actions and temporal information associated with the user actions, determining a usage pattern based on the logged user actions and the temporal information and determining at least one function adjustment based on the usage pattern.

A further related aspect is provided by a computer program product comprising a computer readable medium. The computer readable medium includes a first set of codes for causing a computer to log user actions and temporal information associated with the user actions, a second set of codes for causing the computer to determine a usage pattern based on the logged user actions and the temporal information, and a third set of codes for causing the computer to determine at least one function adjustment based on the usage pattern.

Another aspect is provided for by a wireless communication device that includes a computer platform including a processor and a memory, a user action log stored in the memory operable for storing user actions and associated temporal information and a function adjustment module stored in the memory and executable by the processor. The function adjustment module includes usage pattern logic operable for determining a usage pattern based on the logged user actions and the temporal information, adjustment determination logic operable for determining at least one function adjustment based on the usage pattern, and adjustment logic operable to adjust at least one function of the wireless communication device based on the corresponding at least one function adjustment. The user actions that are logged, may include but are not limited to, communication calls made, communication calls received, applications accessed and functionality implemented. The device may further include a location determining device, such as a GPS sensor, or an environmental sensing device such that user action log further stores geographic location information and/or environmental condition data associated with the user actions and such that the usage pattern logic is further operable for determining a usage pattern based on the logged user actions, the temporal information and the geographic location information and/or the environmental conditions. The adjustment determination logic may further include one or more predetermined algorithms or one or more heuristic simulation modules such that the at least one function adjustment is based on a predetermined algorithm and/or a heuristic simulation model.

A related aspect is provided by a wireless communication device that includes means for logging user actions and temporal information associated with the user actions, means for determining a usage pattern based on the logged user actions and the temporal information, means for determining at least one function adjustment based on the usage pattern, and means for adjusting at least one function of the wireless communication device based on the corresponding at least one function adjustment.

In yet another aspect, a method for adapting a wireless communication device is provided. The method includes detecting one or more environmental condition at a wireless communication device, logging the environmental conditions and associated temporal information, determining an environmental condition pattern based on the logged environmental conditions and the associated temporal information and determining at least one adjustment action based on the environmental condition pattern. The method may further include adjusting at least one function of the wireless communication device based on the corresponding at least one function adjustment. The logged environmental conditions may include, but are not limited to, ambient light intensity, ambient noise level, ambient temperature, wireless device motion and the like. Additionally, the method may include logging geographic location information associated with the environmental conditions, such that determining an environmental condition pattern includes determining an environmental condition pattern based on the environmental conditions, the temporal information and the geographic location information. The adjustment action may include, but is not limited to, function parameter adjustment, function activation, function deactivation and the like. Determining an environmental condition pattern may include, but is not limited to, determining an environmental pattern based a heuristic simulation, a predetermined algorithm and/or a comparison to a predetermined environmental pattern threshold. Determining at least one adjustment action based on the environmental condition pattern may include, but is not limited to, determining the at least one adjustment action based on a heuristic simulation, a predetermined algorithm and/or a comparison to a predetermined environmental threshold.

A related aspect is defined by at least one processor configured to perform the actions of detecting one or more environmental condition at a wireless communication device, logging the environmental conditions and associated temporal information, determining an environmental condition pattern based on the logged environmental conditions and the associated temporal information and determining at least one adjustment action based on the environmental condition pattern.

A further related aspect is defined by computer program product comprising a computer readable medium. The instructions include a first set of codes for causing a computer to detect one or more environmental condition at a wireless communication device, a second set of codes for causing the computer to log the environmental conditions and associated temporal information, a third set of codes for causing the computer to determine an environmental condition pattern based on the logged environmental conditions and the associated temporal information, and a fourth set of codes for causing the computer to determine at least one adjustment action based on the environmental condition pattern.

Yet another aspect is provided for by a wireless communication device. The device includes a computer platform including a processor and a memory, an environmental condition log stored in the memory operable for storing environmental conditions and associated temporal information and a function adjustment module stored in the memory and executable by the processor. The environmental function adjustment module includes environmental condition pattern logic operable for determining an environmental condition pattern based on the logged environmental conditions and the temporal information, adjustment determination logic operable for determining at least one function adjustment based on the environmental condition pattern, and adjustment logic operable for adjusting at least one function of the wireless communication device based on the corresponding at least one function adjustment.

A related aspect is defined by a wireless communication device that includes means for detecting one or more environmental condition at a wireless communication device, means for logging the environmental conditions and associated temporal information, means for determining an environmental condition pattern based on the logged environmental conditions and the associated temporal information, and means for determining at least one adjustment action based on the environmental condition pattern.

To the accomplishment of the foregoing and related ends, the one or more aspects include the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

As such, the present aspects provide for methods, computer program products, processors and apparatus for adaptation of a wireless communication device based on current environmental conditions, historical environmental condition patterns and/or historical usage patterns. In this regard, the device senses such environmental conditions as light, sound, motion, temperature and the like and adjusts functionality on the device that is affected by these conditions. Additionally, by determining environmental and usage patterns the device can adapt to the patterns by providing certain functionality and/or applications to the user at prescribed times of the day, week, month, etc. By being able to automatically adapt the functionality of a wireless communication device, the user of such a device is experiences greater ease in using the device and an overall heightened user experience.

DETAILED DESCRIPTION

The present apparatus, computer program products, processors and methods now will be described more fully hereinafter with reference to the accompanying drawings, in which aspects of the invention are shown. These aspects may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The various aspects are described herein in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Figure 1:
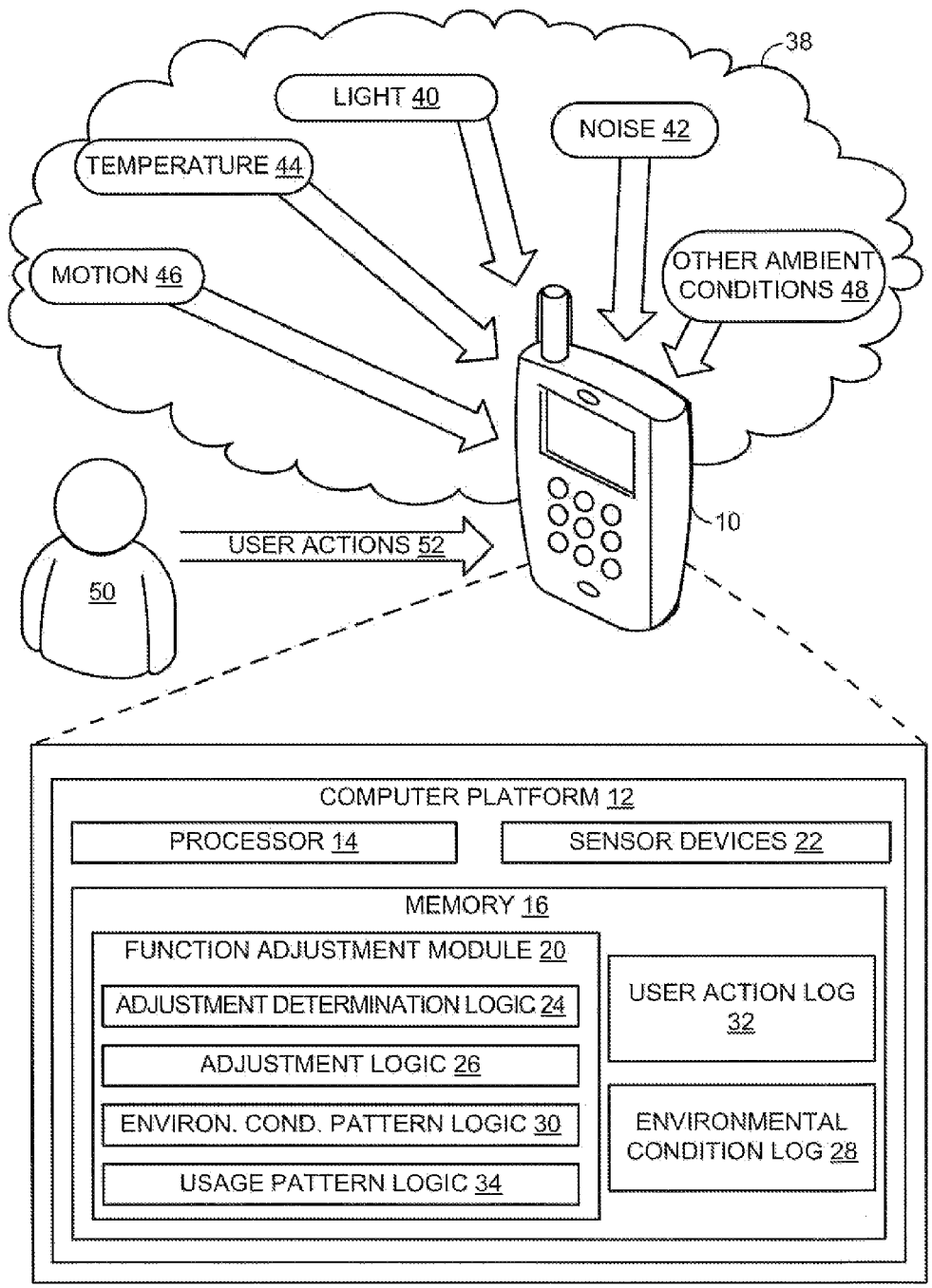
FIG. 1 is a schematic representation of wireless device configured to adapt to current environmental conditions, historical environmental patterns and/or historical usage patterns; according to one aspect.

Referring to FIG. 1, a schematic representation of a system for adapting a wireless communication device to environmental and behavioral conditions is presented. The wireless communication device 10, commonly referred as a "smart" device due to processing capability, includes a computer platform 12 having a processor 14 and memory 16. The memory 16 of wireless communication device 18 stores a function adjustment module 20 that is operable for adjusting functions based on current ambient environmental conditions, historical environmental condition patterns, and/or historical usage patterns. The term "adjusting functions" as defined herein includes adjusting any parameters or settings associated with a device function, application, module, program or the like running on the device. In addition the term "adjusting functions" as defined herein includes activating or deactivating any function, application, module, program or the like on the wireless communication device.

In aspects in which the function adjustment module is configured to adjust functions based on current ambient environmental conditions the wireless communication device will include one or more sensor devices 22 that are operable for sensing or otherwise detecting the ambient environmental conditions in ambient environment 38. As shown in FIG. 1, ambient environment conditions may include light 40, noise 42, temperature 44, device motion 46 and any other ambient conditions 48. As such, the sensor devices 22 may include, but are not limited to, a photo-cell for detecting light intensity, a microphone and audio level detector for detecting noise volume, an accelerometer for detecting the rate of motion in the wireless device, a thermometer for detecting temperature and the like. Adjustment determination logic 24, included in the function adjustment module 20, is operable for determining if a detected environmental condition warrants adjustment to one or more wireless communication device functions. Determining if a detected environmental condition warrants adjustment to one or more wireless device functions may be accomplished by comparing the detected conditions to predetermined adjustment thresholds, implementation of one or more predetermined algorithms and/or one or more heuristic simulation models.

The adjustment determination logic 24 is also operable for determining an adjustment action for the one or more wireless device functions if the detected environmental condition is determined to warrant adjustment. The "adjustment action" as defined herein may include adjustment to a function or application parameter or setting and/or activation/deactivation of a function or application. For example, detected light intensity conditions may warrant adjustment to display contrast and/or display brightness settings, detected noise level may warrant adjustment to ringer volume, ringer frequency, vibration intensity, vibration frequency and/or speaker volume, detected device motion may activate/deactivate a voice-activated dialer function, detected temperature may activate/deactivate a power-down or limited-use function and the like. The term "determining an adjustment action" as defined herein may also include determining the amount of adjustment. The amount of adjustment needed will depend on the severity of the environmental condition detected. Determining adjustment action may be accomplished by implementation of one or more look-up tables, one or more predetermined algorithms and/or one or more heuristic simulation models.

The function adjustment module 20 additionally includes adjustment logic 26 operable for operable for adjusting the one or more wireless communication device functions based on the determined adjustment action. In some aspects, adjustment may be pre-configured by the user to occur automatically upon detection of an environmental condition that warrants adjustment. In alternate aspects, the user may be prompted, typically by visual display, to accept or decline the adjustment action. Additionally, the adjustment logic may be preconfigured to make the adjustment for a preconfigured period of time at which time the device reverts back to the pre-adjustment setting or actions or, alternatively, the adjustment may remain in force until subsequent detection of environmental conditions warrants adjustment to the pre-adjustment setting or action or any other necessary adjustment.

In aspects in which the function adjustment module 20 is configured to adjust functions based on historical environmental condition patterns the wireless communication device will include an environmental condition log 28 that at is operable for logging the environmental conditions and the temporal information associated with the logged environmental conditions. Additionally, the wireless device may include a location-determining device, such as a Global Positioning Sensor (GPS) (not shown in FIG. 1) and a location may be associated and logged with the historical environmental condition data and the temporal information for the purpose of establishing historical environmental condition patterns based on time and location. The function adjustment module 20 additionally includes environmental condition pattern logic 30 operable for establishing an environmental condition pattern. Establishing an environmental condition pattern may be accomplished by comparing logged environmental condition data to preconfigured environmental condition pattern thresholds, implementing one or more pattern algorithms and/or implementing one or more heuristic simulation models.

Once the environmental condition pattern logic 30 has established an environmental condition pattern the function adjustment module will invoke the adjustment determination logic 24 to determine at least one adjustment action based on the environmental condition pattern and the adjustment logic 26 to adjust at least one function of the wireless communication device based on the corresponding at least one adjustment action. The "adjustment action" as defined herein may include adjustment to a function or application parameter or setting and/or activation/deactivation of a function or application. For example, a detected light intensity pattern may warrant adjustment to display contrast and/or display brightness settings, a detected noise level pattern may warrant adjustment to ringer volume, ringer frequency, vibration intensity, vibration frequency and/or speaker volume, a detected device motion pattern may activate/deactivate a voice-activated dialer function, a detected temperature pattern may activate/deactivate a power-down or limited-use function and the like. The term "determining an adjustment action" as defined herein may also include determining the amount of adjustment or the pattern for adjustment. The amount or pattern of adjustment needed will depend on many factors, included but not limited to, the severity of the environmental condition pattern established, changes in the pattern, the duration of the pattern and the like. Determining adjustment action may be accomplished by implementation of one or more look-up tables, one or more predetermined algorithms and/or one or more heuristic simulation models.

The adjustment logic 26 may be preconfigured by the user to automatically implement the adjustment action(s) upon establishment of an environmental condition pattern. In alternate aspects, the user may be prompted, typically by visual display, to accept or decline the adjustment action(s). Typically, the adjustment will last for the time period of the determined pattern, however, user configuration may provide for the adjustment actions to be suspended at any time during the adjustment time period and for the wireless device to resort back to pre-adjustment parameter settings and/or functionality.

In aspects in which the function adjustment module 20 is configured to adjust functions based on historical usage patterns the wireless communication device will include a user action log 32 that at is operable for logging user 50 inputs or user actions 52 and the temporal information associated with the logged environmental conditions. User actions may include communication calls made, communication calls received, functions used, applications executed and the like. Additionally, the wireless device may include a location determining device, such as a Global Positioning Sensor (GPS) (not shown in FIG. 1) and a location may be associated and logged with the historical usage data and the temporal information for the purpose of establishing historical environmental condition patterns based on time and location. The function adjustment module 20 additionally includes usage pattern logic 34 operable for establishing a usage pattern. Establishing a usage pattern may be accomplished by comparing logged user actions to preconfigured user action pattern thresholds, implementing one or more pattern algorithms and/or implementing one or more heuristic simulation models.

Once the usage pattern logic 34 has established a usage pattern the function adjustment module will invoke the adjustment determination logic 24 to determine at least one adjustment action based on the usage pattern and the adjustment logic 26 to adjust at least one function of the wireless communication device based on the corresponding at least one adjustment action. The "adjustment action" as defined herein may include adjustment to a function or application parameter or setting and/or activation/deactivation of a function or application. For example, a usage pattern defined by the placement of a specific communication call at a specific time on a daily basis may result in an "adjustment action" of prompting the user to make the call prior to the specific time or automatically placing the call at the specific time. In another example, a usage pattern may be defined by launching a web browser application and accessing a specific Internet site at a specific times during the day to obtain, weather, news, sports, stock information or the like and the resulting "adjustment action" may be to prompt the user to launch the web browser application at specific times or automatic launching of the web browser application and automatically directing the browser to specific sites of interest. Determining the adjustment action will typically be dictated by the defined usage pattern and may involve associating the usage pattern with one or more adjustment actions stored in a corresponding look-up table.

The adjustment logic 26 may be preconfigured by the user to automatically implement the adjustment action(s) upon establishment of a usage pattern. In alternate aspects, the user may be prompted, typically by visual display, to accept or decline the adjustment action(s).

Figure 2:
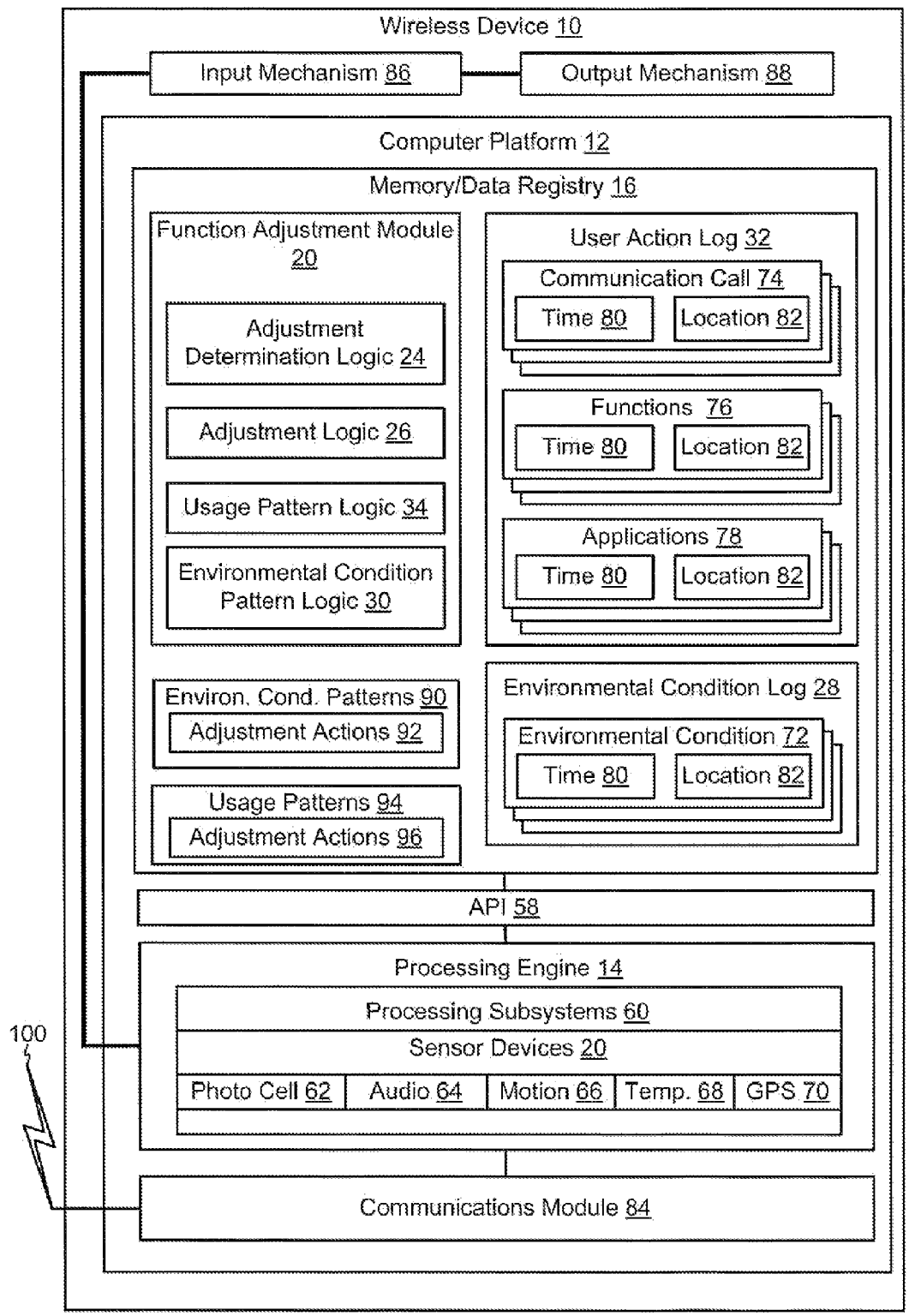
FIG. 2 is a block diagram of a wireless communication device configured for environmental and behavioral adaptation, according to one aspect.

Referring to FIG. 2, according to one aspect, a block diagram representation of a wireless communication device 10 operable for providing environmental and behavioral adaptation is depicted. The wireless communication device 10 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 10 includes computer platform 12 that can transmit data across a wireless network, and that can receive and execute routines and applications. Computer platform 12 includes memory/data registry 16, which may comprise volatile and nonvolatile memory such as read-only and/or random-access memory (RAM and ROM), EPROM, EEPROM, flash cards, or any memory common to computer platforms. Further, memory/data registry 16 may include one or more flash memory cells, or may be any secondary or tertiary storage device, such as magnetic media, optical media, tape, or soft or hard disk.

Further, computer platform 12 also includes a processing engine 14, which may be an application-specific integrated circuit ("ASIC"), or other chipset, processor, logic circuit, or other data processing device. Processing engine 14 or other processor such as ASIC may execute an application programming interface ("API") layer 58 that interfaces with any resident programs, such as function adjustment module 20, stored in the data registry 16 of the wireless device 10. API 58 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 14 includes various processing subsystems 60 embodied in hardware, firmware, software, and combinations thereof, that enable the functionality of communication device 10 and the operability of the communication device on a wireless network. For example, processing subsystems 60 allow for initiating and maintaining communications, and exchanging data, with other networked devices. In present aspects, in which the function adjustment module 20 relies on subsystems to detect environmental conditions, the subsystems may include, but are not limited to, one or sensor device 20. For example the sensor devices may include photo-cell 62 operable for sensing light intensity, audio level sensor 64 operable for sensing audio level, accelerometer or motion sensor 66 operable for sensing motion in the wireless device, temperature sensor 68 operable for sensing temperature and location or GPS sensor 70 operable for determining position. In aspects in which the communication device is defined as a cellular telephone the communications processing engine 14 may additionally include one or a combination of processing subsystems 60, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 60 of processing engine 14 may include any subsystem components that interact with applications executing on computer platform 12.

The data registry 16 of computer platform 12 includes function adjustment module 20 that is operable for adjusting functions based on current ambient environmental conditions, historical environmental condition patterns, and/or historical usage patterns. In aspects in which the function adjustment module 20 is configured to adjust functions based on current ambient environmental conditions the module will implement adjustment determination logic 24, which is operable for determining if a detected environmental condition warrants adjustment to one or more wireless communication device functions. Determining if a detected environmental condition warrants adjustment to one or more wireless device functions may be accomplished by comparing the detected conditions to predetermined adjustment thresholds, implementation of one or more predetermined algorithms and/or one or more heuristic simulation models.

It should be noted that sensor devices 20 that are operable for detecting environmental conditions may be configured such that sensing or detection occurs at predetermined intervals or based on predetermined actions. For example, a keypad input or a received communication call may prompt sensing of environmental conditions. Certain sensor devices will require battery power for implementation and, therefore, optimizing usage of the sensor devices is imperative.

The adjustment determination logic 24 is also operable for determining an adjustment action for the one or more wireless device functions if the detected environmental condition is determined to warrant adjustment. As previously noted, the "adjustment action" as defined herein may include adjustment to a function or application parameter or setting and/or activation/deactivation of a function or application. Additionally, as previously noted, the term "determining an adjustment action" as defined herein may also include determining the amount of adjustment. The amount of adjustment needed will depend on the severity of the environmental condition detected. Determining adjustment action may be accomplished by implementation of one or more look-up tables, one or more predetermined algorithms and/or one or more heuristic simulation models.

The function adjustment module 20 additionally includes adjustment logic 26 operable for operable for adjusting the one or more wireless communication device functions based on the determined adjustment action. In some aspects, adjustment may be pre-configured by the user to occur automatically upon detection of an environmental condition that warrants adjustment. In alternate aspects, the user may be prompted, typically by visual display, to accept or decline the adjustment action. Additionally, the adjustment logic may be preconfigured to make the adjustment for a preconfigured period of time at which time the device reverts back to the pre-adjustment setting or actions or, alternatively, the adjustment may remain in force until subsequent detection of environmental conditions warrants adjustment to the pre-adjustment setting or action or any other necessary adjustment.

In aspects in which the function adjustment module 20 is configured to adjust functions based on historical environmental condition patterns the wireless communication device will include an environmental condition log 28 that at is operable for logging environmental condition data 72 and the time information 80 associated with the logged environmental conditions. Additionally, the wireless device may include a location-determining device, such as a Global Positioning Sensor (GPS) 70 and a location 82 may be associated and logged with the historical environmental condition data 72 and the time information 80 for the purpose of establishing historical environmental condition patterns based on time and location. The function adjustment module 20 additionally includes environmental condition pattern logic 30 operable for establishing an environmental condition pattern 90. Establishing an environmental condition pattern may be accomplished by comparing logged environmental condition data to preconfigured environmental condition pattern thresholds, implementing one or more pattern algorithms and/or implementing one or more heuristic simulation models.

Once the environmental condition pattern logic 30 has established an environmental condition pattern 90 the function adjustment module will invoke the adjustment determination logic 24 to determine at least one adjustment action 92 based on the environmental condition pattern and the adjustment logic 26 to adjust at least one function of the wireless communication device based on the corresponding at least one adjustment action. As previously noted, the "adjustment action" as defined herein may include adjustment to a function or application parameter or setting and/or activation/ deactivation of a function or application. Additionally, as previously noted, the term "determining an adjustment action" as defined herein may also include determining the amount of adjustment or the pattern for adjustment. The amount or pattern of adjustment needed will depend on many factors, included but not limited to, the severity of the environmental condition pattern established, changes in the pattern, the duration of the pattern and the like. Determining an adjustment action 92 may be accomplished by implementation of one or more look-up tables, one or more predetermined algorithms and/or one or more heuristic simulation models.

The adjustment logic 26 may be preconfigured by the user to automatically implement the adjustment action(s) upon establishment of an environmental condition pattern. In alternate aspects, the user may be prompted, typically by visual display, to accept or decline the adjustment action(s). Typically, the adjustment will last for the time period of the determined pattern, however, user configuration may provide for the adjustment actions to be suspended at any time during the adjustment time period and for the wireless device to resort back to pre-adjustment parameter settings and/or functionality.

In aspects in which the function adjustment module 20 is configured to adjust functions based on historical usage patterns the wireless communication device will include a user action log 32 that at is operable for logging user inputs or user actions and the time information associated with the logged environmental conditions. User actions may include communication calls made and received 74, functions used 76, applications executed 78 and the like. Additionally, the wireless device may include a location determining device, such as a Global Positioning Sensor (GPS) 70 and a location information 82 may be associated and logged with the historical usage data 74, 76, 78 and the time information 80 for the purpose of establishing historical environmental condition patterns based on time and location. The function adjustment module 20 additionally includes usage pattern logic 34 operable for establishing a usage pattern 94. Establishing a usage pattern may be accomplished by comparing logged user actions to preconfigured user action pattern thresholds, implementing one or more pattern algorithms and/or implementing one or more heuristic simulation models.

Once the usage pattern logic 34 has established a usage pattern 94 the function adjustment module will invoke the adjustment determination logic 24 to determine at least one adjustment action 96 based on the usage pattern and the adjustment logic 26 to adjust at least one function of the wireless communication device based on the corresponding at least one adjustment action. The "adjustment action" as defined herein may include adjustment to a function or application parameter or setting and/or activation/deactivation of a function or application. Determining the adjustment action will typically be dictated by the defined usage pattern and may involve associating the usage pattern with one or more adjustment actions stored in a corresponding look-up table.

The adjustment logic 26 may be preconfigured by the user to automatically implement the adjustment action(s) upon establishment of a usage pattern. In alternate aspects, the user may be prompted, typically by visual display, to accept or decline the adjustment action(s).

Computer platform 12 may further include communications module 84 embodied in hardware, firmware, software, and combinations thereof, that enables communications among the various components of the communication device 10, as well as between the communication device 10 and the wireless network 100. The communication module may include the requisite hardware, firmware, software and/or combinations thereof for establishing a wireless or wired network communication connection.

Additionally, communication device 10 has input mechanism 86 for generating inputs into communication device, and output mechanism 88 for generating information for consumption by the user of the communication device. For example, input mechanism 86 may include a mechanism such as a key or keyboard, a mouse, a touch-screen display, a microphone, etc. In certain aspects, the input mechanisms 86 provides for user input to activate an application on the communication device. Further, for example, output mechanism 88 may include a display, an audio speaker, a haptic feedback mechanism, etc.

Figure 3:
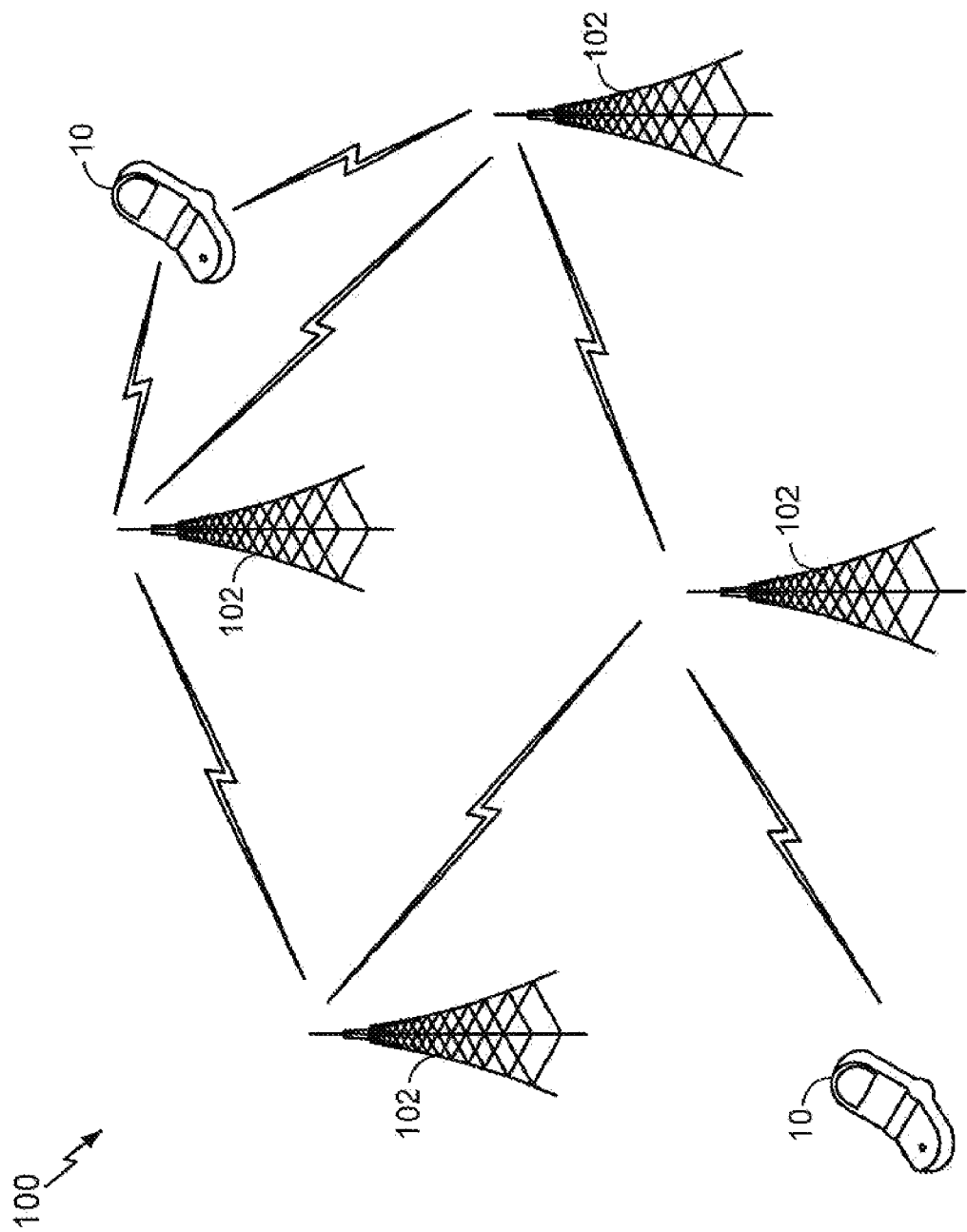
FIG. 3 is a schematic representation of a wireless network communication system as implementing by the wireless communication device of the present aspects.

Referring now to FIG. 3, a wireless network communication system 100 is illustrated in accordance with an aspect. System 100 can include one or more base stations 102 located in one or more cells that receive, transmit, repeat, etc., wireless communication signals to each other and/or to one or more wireless communication devices 10. Each base station 102 can include a transmitter chain and a receiver chain (not shown in FIG. 3), each of which can in turn include a plurality of components associated with signal transmission and reception (e.g., processors, modulators, multiplexers, demodulators, demultiplexers, antennas, etc.), as will be appreciated by one skilled in the art. Wireless communication devices 10 can be, for example, cellular phones, smart phones, laptops, handheld communication devices, handheld computing devices, satellite radios, global positioning systems, PDAs, and/or any other suitable device for communicating over wireless network 100. System 100 can be employed in conjunction with various aspects described herein in order to facilitate adaptation of the wireless communication devices based on environmental and/or behavior conditions and/or patterns.

Figure 4:
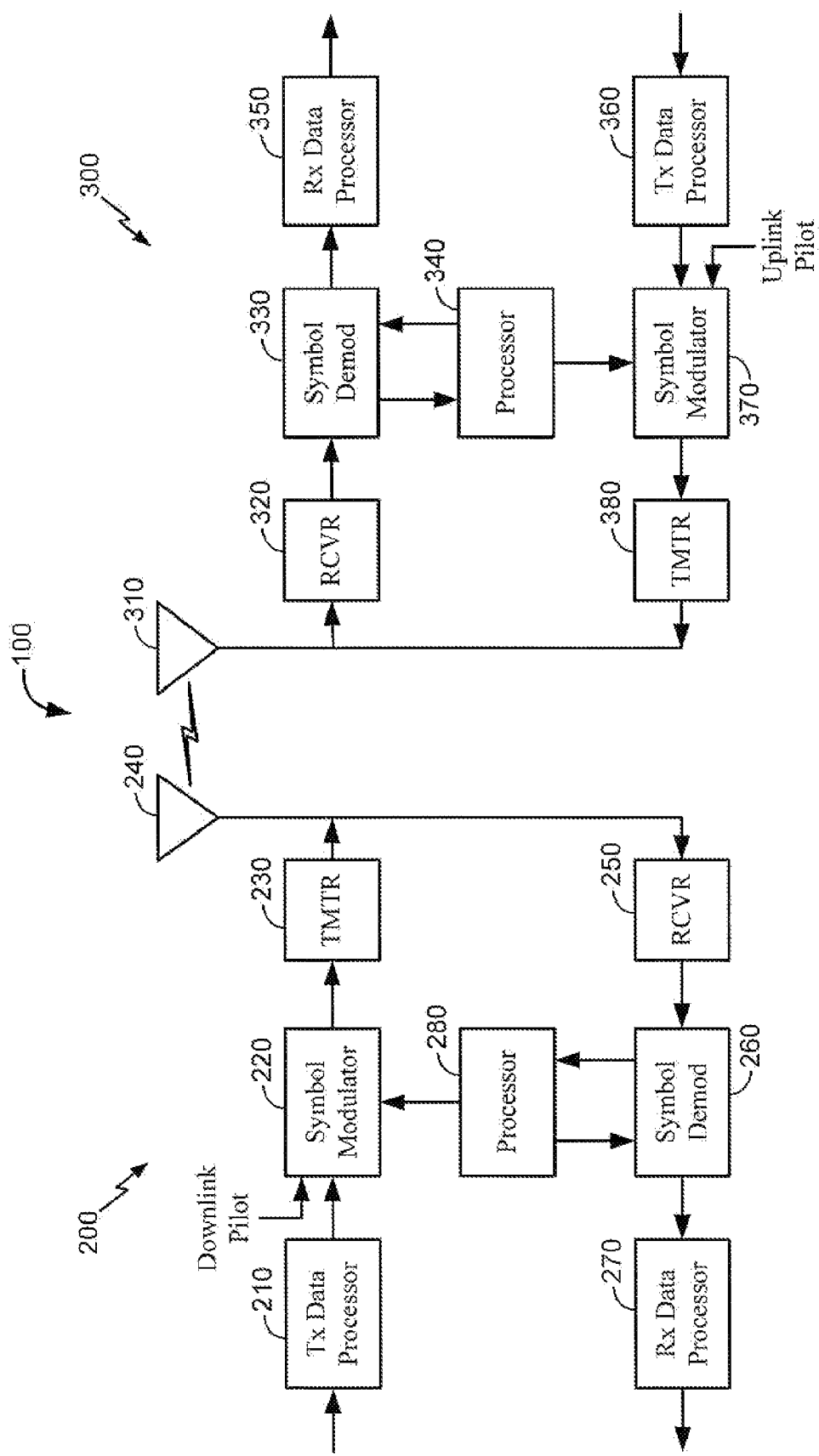
FIG. 4 is a block diagram representation of wireless communication between the wireless communication devices of the present aspects.

FIG. 4 is block diagram illustration of a wireless network 100 environment that can be employed in accordance with an aspect. The wireless network shown in FIG. 4 may be implemented in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The wireless network 100 includes an access point 200 and a wireless communication device 300. Access point 200 includes a transmit (TX) data processor 210 that receives, formats, codes, interleaves, and modulates (or symbol maps) traffic data and provides modulation symbols ("data symbols"). The TX data processor 210 is in communication with symbol modulator 220 that receives and processes the data symbols and pilot symbols and provides a stream of symbols. Symbol modulator 220 is in communication with transmitter unit (TMTR) 230, such that symbol modulator 220 multiplexes data and pilot symbols and provides them to transmitter unit (TMTR) 230. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 230 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through antenna 240 to the terminals.

At wireless communication device 300, antenna 310 receives the downlink signal and provides a received signal to receiver unit (RCVR) 320. Receiver unit 320 conditions (e.g., filters, amplifies, and frequency downconverts) the received signal and digitizes the conditioned signal to obtain samples. Receiver unit 320 is in communication with symbol demodulator 330 that demodulates the conditioned received signal. Symbol demodulator 330 is in communication with processor 340 that receives pilot symbols from symbol demodulator 330 and performs channel estimation on the pilot symbols. Symbol demodulator 330 further receives a frequency response estimate for the downlink from processor 340 and performs data demodulation on the received data symbols to obtain data symbol estimates (which are estimates of the transmitted data symbols). The symbol demodulator 330 is also in communication with RX data processor 350, which receives data symbol estimates from the symbol demodulator and demodulates (i.e., symbol demaps), deinterleaves, and decodes the data symbol estimates to recover the transmitted traffic data. The processing by symbol demodulator 330 and RX data processor 350 is complementary to the processing by symbol modulator 220 and TX data processor 210, respectively, at access point 200.

On the uplink, a TX data processor 360 processes traffic data and provides data symbols. The TX data processor is in communication with symbol modulator 370 that receives and multiplexes the data symbols with pilot symbols, performs modulation, and provides a stream of symbols. The symbol modulator 370 is in communication with transmitter unit 380, which receives and processes the stream of symbols to generate an uplink signal, which is transmitted by the antenna 310 to the access point 200.

At access point 200, the uplink signal from wireless communication device 200 is received by the antenna 240 and processed by a receiver unit 250 to obtain samples. The receiver unit 250 is in communication with symbol demodulator 260 then processes the samples and provides received pilot symbols and data symbol estimates for the uplink. The symbol demodulator 260 is in communication with RX data processor 270 that processes the data symbol estimates to recover the traffic data transmitted by wireless communication device 200. The symbol demodulator is also in communication with processor 280 that performs channel estimation for each active terminal transmitting on the uplink. Multiple terminals may transmit pilot concurrently on the uplink on their respective assigned sets of pilot subbands, where the pilot subband sets may be interlaced.

Processors 280 and 340 direct (e.g., control, coordinate, manage, etc.) operation at access point 200 and wireless communication device 300, respectively. Respective processors 280 and 340 can be associated with memory units (not shown) that store program codes and data. Processors 280 and 340 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 280 and 340.

Figure 5:
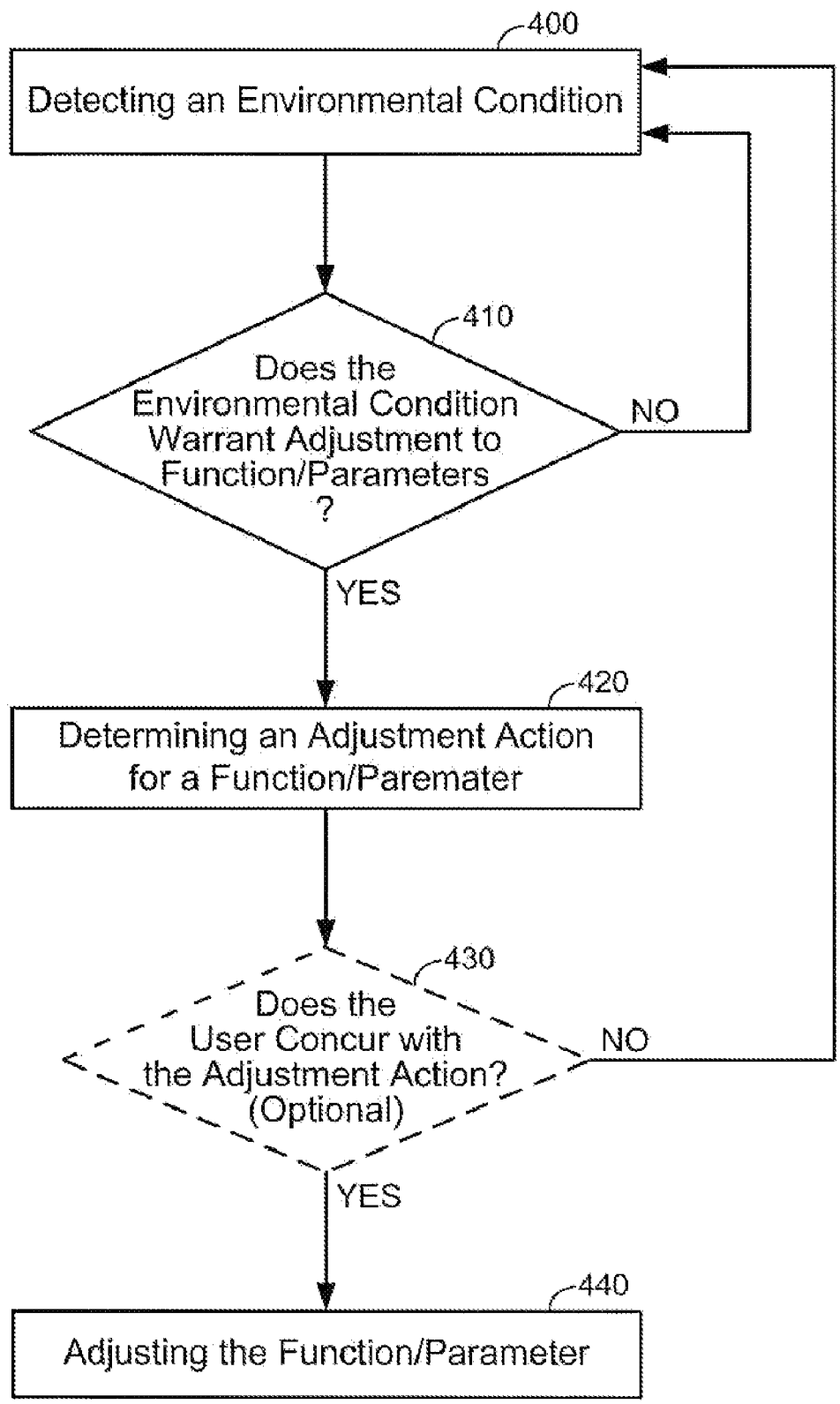
FIG. 5 is a flow diagram of a method for adapting a wireless communication device based on current environmental conditions, according to one aspect.

Referring to FIG. 5, a flow diagram is presented of a method for adapting a wireless communication device based on ambient environmental conditions. At Event 400 the wireless device detects environmental conditions. Detection may occur via one or more sensor/detector devices embodied within the wireless communication device. The detected environmental conditions may include, but are not limited to, light intensity, noise level, wireless device motion, temperature and the like. As previously noted, the wireless communication device may be configured to detect environmental conditions at predetermined time intervals or based on the occurrence of predetermined events, such as receipt of a communication call, placing a communication call, entering a keypad entry and the like.

At Decision 410, the wireless communication device determines whether one or more of the detected environmental conditions warrants adjustment to a device function/application or function/application parameters or settings. Determining whether an adjustment is warranted may be accomplished by comparing the detected environmental conditions to adjustment thresholds, implementing one or more adjustment determining algorithms and/or implementing one or more heuristic simulation models. If the decision results in a determination that adjustment is not warranted, the method returns to Event 400 and further detecting of environmental conditions ensues.

If Decision 410 results in a determination that the detected environmental conditions warrant an adjustment, at Event 420, an adjustment action is determined for functions, applications and/or parameters/settings related to the functions or applications. An adjustment action may include, but is not limited to, altering parameters or settings for a function or application, activating a function or application or deactivating a function. In the instance in which the adjustment action includes altering parameters or settings, determining the adjustment action may include the amount of adjustment necessary in light of the detected environmental conditions. Determining an adjustment action may be accomplished by accessing a look-up table that correlates the environmental condition warranting adjustment to one or more adjustment actions. For example, if light intensity is the environmental condition warranting adjustment, the adjustment actions may be altering display brightness and/or display contrast. In another example, if noise level is the environmental condition warranting adjustment, the adjustment actions may be altering ring tone volume or ring tone frequency, activating vibration mode, altering vibration intensity or frequency and/or altering speaker volume. Additionally, one or more look-up tables, one or more adjustment algorithms and/or one or more heuristic simulation models may be implemented to determine the adjustment amount necessary for altering a function or application setting or parameter.

At optional Decision 430, the wireless device determines if the user accepts the adjustment action. The wireless device may be configured such that some or all of the environmental based adjustments require user acquiescence prior to being implemented. Typically, in some aspects, adjustments may be proposed to the user by providing an audio signal to the user and displaying the proposed adjustment on the corresponding device display. In other aspects the wireless device may be configured to automatically implement some or all of the adjustment actions without requiring user acceptance. If the user chooses to decline the adjustment action, the method will return to Event 400 and further detection of environmental conditions ensues. If the user chooses to accept the adjustment action, at Event 440, the adjustment is made to the function, application and/or function/application parameters or settings.

Figure 6:
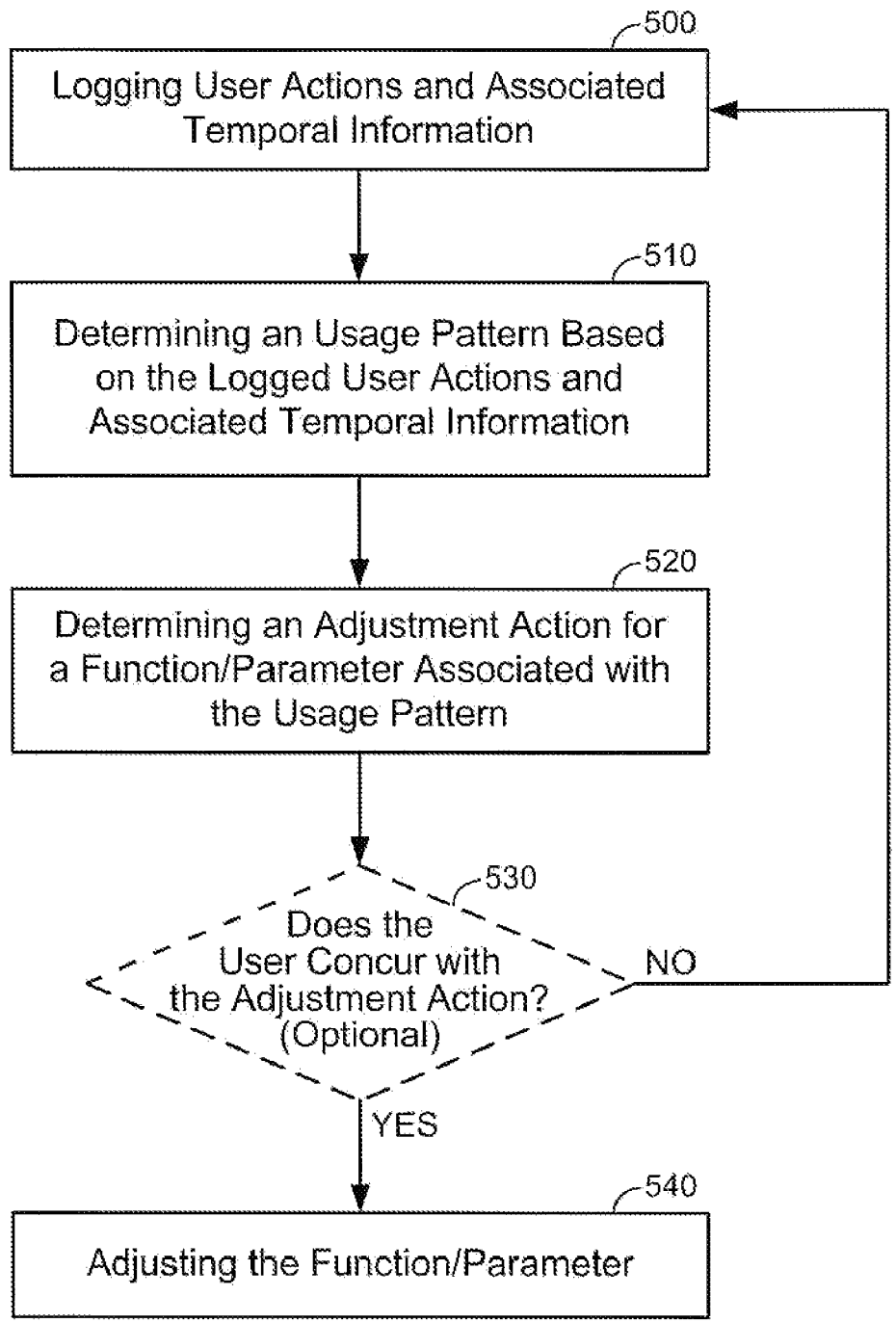
FIG. 6 is a flow diagram of a method for adapting a wireless communication device based on historical usage patterns, according to one aspect.

Referring to FIG. 6, a flow diagram is presented of a method for adapting a wireless communication device based on historical usage patterns. At Event 500, the wireless communication device logs user actions and associated temporal information. The user actions may include, but are not limited to, communication calls made, communication calls received, applications implemented, functionality employed and the like. Each user action will have temporal information associated therewith, such as the date and time of the action and the duration of the action. At Event 510, the wireless communication device determines a usage pattern based on the logged user actions and associated temporal information. For example, if a user places the same communication call at generally the same time of every weekday, the wireless device may define these actions as a usage pattern. In other example, if a user accesses a web browser application and obtains news information from a specific site at prescribed time periods throughout the day, the wireless device may define these actions as a usage pattern. A usage pattern may be determined by comparing logged user actions to usage pattern thresholds, implementing one or more usage pattern algorithms and/or implementing one or more heuristic simulation models.

At Event 520, an adjustment action is determined for functions, applications and/or parameters/settings related to the functions or applications. An adjustment action may include, but is not limited to, altering parameters or settings for a function or application, activating a function or application or deactivating a function. In the instance in which the adjustment action includes altering parameters or settings, determining the adjustment action may include the amount of adjustment necessary in light of the detected environmental conditions. Determining an adjustment action may be accomplished by accessing a look-up table that correlates the usage pattern to one or more adjustment actions. For example, if launching a web browser and accessing news information at specific times of the day is the defined usage pattern, the adjustment actions may be to automatically launch the web browser and automatically redirect to the news site of interest.

At optional Decision 530, the wireless device determines if the user accepts the adjustment action. The wireless device may be configured by the user such that some or all of the determined usage patterns require user acquiescence prior to adjustments being implemented. Typically, in some aspects, adjustments may be proposed to the user by providing an audio signal to the user and displaying the proposed adjustment on the corresponding device display. For example, a user may be prompted to accept or reject the automatic launching of a web browser or the automatic placement of a communication call. In other aspects the wireless device may be configured to automatically implement some or all of the adjustment actions without requiring user acceptance. If the user chooses to decline the adjustment action, the method will return to Event 500 and further logging of user actions ensues. If the user chooses to accept the adjustment action, at Event 540, the adjustment is made to the function, application and/or function/application parameters or settings.

Figure 7:
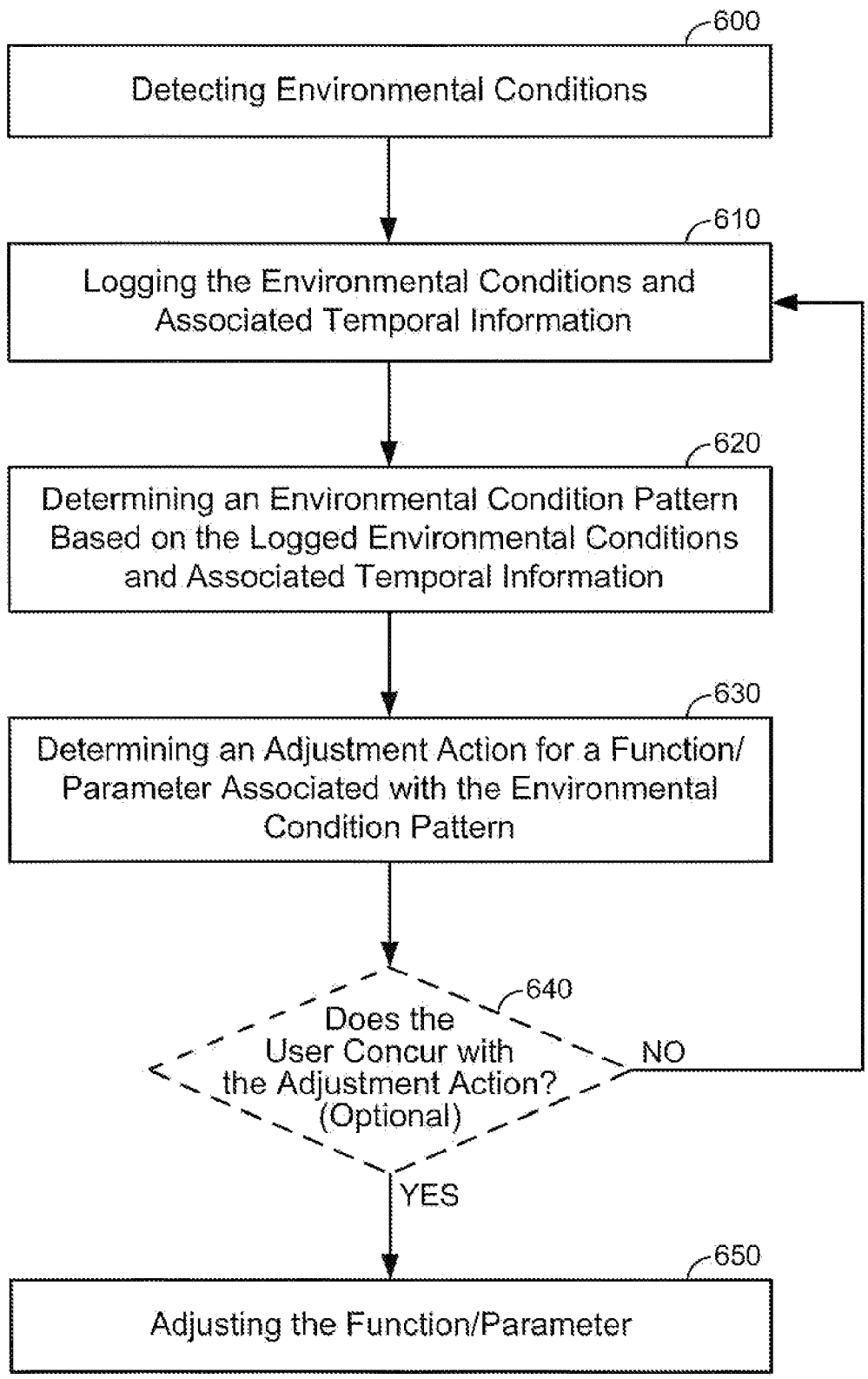
FIG. 7 is a flow diagram of a method for adapting a wireless communication device based on historical environmental condition patterns, according to one aspect.

Referring to FIG. 7, a flow diagram is presented of a method for adapting a wireless communication device based on historical environmental conditions. At Event 600 the wireless device detects environmental conditions. Detection may occur via one or more sensor/detector devices embodied within the wireless communication device. The detected environmental conditions may include, but are not limited to, light intensity, noise level, wireless device motion, temperature and the like. At Event 610, the wireless communication device logs the detected environmental conditions and associated temporal information. The environmental conditions may include, but are not limited to, light intensity, noise volume, temperature, wireless device motion and the like. Each environmental condition will have temporal information associated therewith, such as the date and time of the condition and the duration of the condition. At Event 620, the wireless communication device determines an environmental condition pattern based on the logged environmental conditions and associated temporal information. For example, if the device experiences the same light intensity (for example, bright sunlight) or noise level (for example, industrial workplace noise) at generally the same time of every weekday for a specific time period, the wireless device may define this condition as an environmental condition pattern. An environmental condition pattern may be determined by comparing logged environmental conditions to environmental condition pattern thresholds, implementing one or more environmental condition pattern algorithms and/or implementing one or more heuristic simulation models.

At Event 630, an adjustment action is determined for functions, applications and/or parameters/settings related to the functions or applications. An adjustment action may include, but is not limited to, altering parameters or settings for a function or application, activating a function or application or deactivating a function. In the instance in which the adjustment action includes altering parameters or settings, determining the adjustment action may include the amount of adjustment necessary in view of the detected environmental conditions. Determining an adjustment action may be accomplished by accessing a look-up table that correlates the environmental condition pattern to one or more adjustment actions. For example, if the environmental condition pattern is defined by light intensity for a specified time period, for example sunlight between 8 am-5 pm weekdays, the adjustment actions may be to automatically adjust the display brightness and display contrast to account for the light intensity pattern.

At optional Decision 640, the wireless device determines if the user accepts the adjustment action. The wireless device may be configured by the user such that some or all of the determined environmental condition patterns require user acquiescence prior to adjustments being implemented. Typically, in some aspects, adjustments may be proposed to the user by providing an audio signal to the user and displaying the proposed adjustment on the corresponding device display. For example, a user may be prompted to accept or reject the automatic adjustment of ring tone volume for a prescribed period of time or the automatic adjustment of ring tone to vibration tone for a prescribed period of time. In other aspects the wireless device may be configured to automatically implement some or all of the adjustment actions without requiring user acceptance. If the user chooses to decline the adjustment action, the method will return to Event 600 and further detecting of environmental conditions ensues. If the user chooses to accept the adjustment action, at Event 650, the adjustment is made to the function, application and/or function/application parameters or settings.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may be defined in a computer program product residing as a computer readable medium having one or any combination or set of codes operable to cause a computer to implement the steps and/or actions.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, the described aspects provide for adaptation of a wireless communication device based on current environmental conditions, historical environmental condition patterns and/or historical usage patterns. In this regard, the device senses such environmental conditions as light, sound, motion, temperature and the like and adjusts functionality on the device that is affected by these conditions. Additionally, by determining environmental and usage patterns the device can adapt to the patterns by providing certain functionality and/or applications to the user at prescribed times of the day, week, month, etc. By being able to automatically adapt the functionality of a wireless communication device, the user of such a device is experiences greater ease in using the device and an overall heightened user experience.

Many modifications and other aspects will come to mind to one skilled in the art to which this invention pertains having the benefit of the teachings presented in the foregoing descriptions and the associated drawings. Therefore, it is to be understood that the aspect is not to be limited to the specific aspects disclosed and that modifications and other aspects are intended to be included within the scope of the appended claims. Although specific terms are employed herein, they are used in a generic and descriptive sense only and not for purposes of limitation. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for adapting a wireless communication device, comprising:

detecting one or more environmental conditions at a wireless communication device, wherein the one or more environmental conditions comprise wireless communication device motion;

determining if the one or more detected environmental conditions warrant adjustment to one or more wireless communication device functions, wherein the one or more wireless communication device functions comprise a voice-activated dialer function; and determining an adjustment action for the one or more wireless device functions if the one or more detected environmental conditions is determined to warrant adjustment.

2. The method of claim 1, further comprising adjusting the one or more wireless communication device functions based on the determined adjustment action.

3. The method of claim 2, wherein adjusting the one or more wireless communication device functions further comprises adjusting, automatically, the one or more wireless device functions based on the determined adjustment action.

4. The method of claim 3, wherein automatic adjustment of the one or more wireless device functions occurs based on user pre-configuration.

5. The method of claim 2, wherein adjusting the one or more wireless communication device functions further comprises determining if a user of the wireless communication device accepts the determined adjustment action.

6. The method of claim 1, wherein detecting one or more environmental conditions further comprises detecting ambient light intensity at the wireless communication device.

7. The method of claim 6, wherein the one or more wireless communication device functions are further defined as chosen from the group consisting of display brightness and display contrast.

8. The method of claim 1, wherein detecting one or more environmental conditions further comprises detecting an ambient noise level at the wireless communication device.

9. The method of claim 8, wherein the one or more wireless communication device functions are further defined as chosen from the group consisting of ring tone volume, ring tone frequency, vibration intensity; vibration frequency and speaker volume.

10. The method of claim 1, wherein detecting one or more environmental conditions further comprises detecting ambient temperature at the wireless communication device.

11. The method of claim 1, wherein the one or more wireless communication device functions are further defined as chosen from the group consisting of a power-clown function and a limited-use function.

12. The method of claim 1, wherein determining if the one or more detected environmental conditions warrant adjustment further comprises comparing the detected environmental conditions to one or more predetermined thresholds.

13. The method of claim 1, wherein determining if the one or more detected environmental conditions warrant adjustment further comprises implementing at least one of a heuristic simulation and predetermined algorithm to determine if adjustment is warranted.

14. The method of claim 1, wherein determining an adjustment action further defines the adjustment action as chosen from the group consisting of a function parameter alteration, a function activation and a function deactivation.

15. The method of claim 1, further comprising:
logging user actions and temporal information associated with the user actions;
determining a usage pattern based on the logged user actions and the temporal information; and
wherein determining an adjustment action is further based on the usage pattern.

16. The method of claim 15, further comprising adjusting at least one function of the wireless communication device based on the corresponding adjustment action.

17. The method of claim 15, wherein logging user actions further comprises logging user actions chosen from the group consisting of communication calls made, communication calls received, applications accessed and functionality implemented.

18. The method of claim 15, further comprising logging geographic location information associated the user actions and wherein determining a usage pattern further comprises determining a usage pattern based on the logged user actions, the temporal information and the geographic location information.

19. The method of claim 15, further comprising logging environmental conditions associated with the user actions and wherein determining a usage pattern further comprises determining a usage pattern based on the logged user actions, the temporal information and the environmental conditions.

20. The method of claim 15, wherein determining an adjustment action further comprises determining at least one adjustment chosen from the group consisting of function parameter adjustment, function activation and function deactivation.

21. The method of claim 15, wherein determining a usage pattern based on the logged user actions and the temporal information further comprises comparing the user actions to predetermined usage pattern thresholds to determine a usage pattern.

22. The method of claim 15, wherein determining a usage pattern based on the logged user actions and the temporal information further comprises implementing at least one of a heuristic simulation and a predetermined algorithm to determine a usage pattern.

23. The method of claim 15, further comprising automatically adjusting at least one function of the wireless communication device based on the corresponding adjustment action based on the usage pattern.

24. The method of claim 23, wherein automatically adjusting is based on a user pre-configuration.

25. The method of claim 15, further comprising proposing the adjustment action to a device user for acceptance prior to an adjusting of the one or more functions, and wherein the adjusting comprises adjusting based on a user acceptance of the proposed adjustment action.

26. The method of claim 1 further comprising:
detecting one or more environmental conditions at a wireless communication device;
logging the one or more environmental conditions and associated temporal information;
determining an environmental condition pattern based on the logged environmental conditions and the associated temporal information; and
wherein determining an adjustment action is further based on the environmental condition pattern.

27. The method of claim 26, further comprising adjusting at least one function of the wireless communication device based on the corresponding adjustment action.

28. The method of claim 26, wherein logging the one or more environmental conditions further comprises logging environmental conditions chosen from the group consisting of ambient light intensity, ambient noise level, ambient temperature and wireless device motion.

29. The method of claim 26, further comprising logging geographic location information associated with the environmental conditions and wherein determining an environmental condition pattern further comprises determining an environmental condition pattern based on the environmental conditions, the temporal information and the geographic location information.

30. The method of claim 26, wherein determining an adjustment action further comprises determining at least one adjustment action chosen from the group consisting of function parameter adjustment, function activation and function deactivation.

31. The method of claim 26, wherein determining an environmental condition pattern further comprises determining an environmental pattern based on at least one of a heuristic simulation, a predetermined algorithm and a comparison to a predetermined environmental pattern threshold.

32. The method of claim 26, wherein determining an adjustment action based on the environmental condition pattern further comprises determining based on at least one of a heuristic simulation, a predetermined algorithm and a comparison to a predetermined environmental threshold.

33. The method of claim 26, further comprising automatically adjusting one or more functions based on the determined adjustment action.

34. The method of claim 33, wherein automatically adjusting is further based on a user pre-configuration.

35. The method of claim 26, further comprising proposing the adjustment action to a device user for acceptance prior to an adjusting of the one or more functions.

36. At least one processor configured to perform the actions of:
detecting one or more environmental conditions at a wireless communication device, wherein the one or more environmental conditions comprise wireless communication device motion;
determining if the one or more detected environmental conditions warrant adjustment to one or more wireless communication device functions, wherein the one or more wireless communication device functions comprise a voice-activated dialer function; and
determining an adjustment action for the one or more wireless device functions if the one or more detected environmental conditions is determined to warrant adjustment.

37. The at least one processor of claim 36, further configured to perform the actions of
logging user actions and temporal information associated with the user actions;

determining a usage pattern based on the logged user actions and the temporal information; and wherein determining an adjustment action is further based on the usage pattern.

38. The at least one processor of claim 36, further configured to perform the actions of:

detecting one or more environmental condition at a wireless communication device;

logging the environmental conditions and associated temporal information;

determining an environmental condition pattern based on the logged environmental conditions and the associated temporal information; and wherein determining the adjustment action is further based on the environmental condition pattern.

39. A computer program product, comprising:

a computer-readable medium comprising:

a first set of codes for causing a computer to detect one or more environmental conditions at a wireless communication device, wherein the one or more environmental conditions comprise wireless communication device motion;

a second set of codes for causing the computer to determine if the one or more detected environmental conditions warrant adjustment to one or more wireless communication device functions, wherein the one or more wireless communication device functions comprise a voice-activated dialer function; and a third set of codes for causing the computer to determine an adjustment action for the one or more wireless device functions if the one or more detected environmental conditions is determined to warrant adjustment.

40. The computer program product of claim 39, wherein the computer-readable medium further comprises:

a fourth set of codes for causing a computer to log user actions and temporal information associated with the user actions;

a fourth set of codes for causing the computer to determine a usage pattern based on the logged user actions and the temporal information; and wherein the third set of codes for causing the computer to determine the adjustment action is further based on the usage pattern.

41. The computer program product of claim 39, wherein the computer-readable medium further comprises:

a fourth set of codes for causing a computer to detect one or more environmental conditions at a wireless communication device;

a fifth set of codes for causing the computer to log the one or more environmental conditions and associated temporal information;

a sixth set of codes for causing the computer to determine an environmental condition pattern based on the logged environmental conditions and the associated temporal information; and wherein the third set of codes for causing the computer to determine the adjustment action is further based on the environmental condition pattern.

42. A wireless communication device, comprising:

a computer platform including a processor and a memory;

at least one sensor device in communication with the processor and operable for sensing an environmental condition, wherein the at least one sensor device further comprises an accelerometer operable for sensing motion in the wireless communication device; and a function adjustment module stored in the memory and executable by the processor, wherein the function adjustment module comprises:

adjustment determination logic operable for determining if the sensed environmental condition warrants adjustment to one or more wireless communication device functions and determining an adjustment action for the one or more wireless device functions if the detected environmental condition is determined to warrant adjustment, wherein the adjustment determination logic is further operable for determining if the sensed environmental condition warrants adjustment to a voice-activated dialer function; and adjustment logic operable for adjusting the one or more wireless communication device functions based on the determined adjustment action.

43. The wireless communication device of claim 42, wherein the at least one sensor device further comprises a photo sensor operable for sensing light intensity.

44. The wireless communication device of claim 43, wherein adjustment determination logic is further operable for determining if the sensed environmental condition warrants adjustment to one or more wireless communication device functions, which are chosen from the group consisting of display brightness and display contrast.

45. The wireless communication device of claim 42, wherein the at least one sensor device further comprises an audio level sensor operable for sensing noise level.

46. The wireless communication device of claim 45, wherein adjustment determination logic is further operable for determining if the sensed environmental condition warrants adjustment to one or more wireless communication device functions, which are chosen from the group consisting of ring tone volume, ring tone frequency, vibration intensity, vibration frequency and speaker volume.

47. The wireless communication device of claim 42, wherein the at least one sensor device further comprises a temperature sensor operable for sensing temperature.

48. The wireless communication device of claim 47, wherein adjustment determination logic is further operable for determining if the sensed environmental condition warrants adjustment to one or more wireless communication device functions, which are chosen from the group consisting of a power-down function and a limited-use function.

49. The wireless communication device of claim 42, wherein the adjustment determination logic is further operable for comparing a sensed environmental condition determining value to a predetermined threshold to determine if adjustment is warranted to one or more wireless communication device functions.

50. The wireless communication device of claim 42, wherein the adjustment determination logic is further operable for implementing a predetermined algorithm to determine if adjustment is warranted to one or more wireless communication device functions.

51. The wireless communication device of claim 42, further comprising:

an environmental condition log stored in the memory operable for storing environmental conditions and associated temporal information; and wherein the function adjustment module further comprises:

environmental condition pattern logic operable for determining an environmental condition pattern based on the logged environmental conditions and the temporal information; and wherein the adjustment determination logic is further operable for determining the adjustment action further based on the environmental condition pattern.

52. The wireless communication device of claim 51, wherein the user actions comprise at least one of a communication call made, a communication call received, an application accessed and a functionality implemented.

53. The wireless communication device of claim 51, further comprising a location determining device in communication with the processor and wherein the environmental log further stores geographic location information associated with the environmental condition actions and wherein the environmental condition pattern logic is further operable for determining an environmental condition pattern based on the logged environmental conditions, the temporal information and the geographic location information.

54. The wireless communication device of claim 51, wherein the adjustment determination logic is further operable for determining at least one function adjustment chosen from the group consisting of function parameter adjustment, function activation and function deactivation.

55. The wireless communication device of claim 51, wherein the adjustment determination logic comprises a predetermined algorithm, and wherein the adjustment action is based on the predetermined algorithm.

56. The wireless communication device of claim 51, wherein the adjustment logic is further operable for automatically adjusting based on the environmental condition pattern.

57. The wireless communication device of claim 56, wherein the adjustment logic is further operable for automatically adjusting based on a user pre-configuration associated with the environmental condition pattern.

58. The wireless communication device of claim 51, wherein the adjustment logic is further operable for proposing the adjustment action to a device user for acceptance prior to adjusting the one or more functions.

59. The wireless communication device of claim 42, wherein the adjustment logic is further operable for adjusting, automatically, the one or more wireless device functions based on the determined adjustment action.

60. The wireless communication device of claim 59, wherein the adjustment logic is further operable to provide for automatic adjustment of the one or more wireless device functions occurs based on user pre-configuration.

61. The wireless communication device of claim 42, wherein the adjustment-logic is further operable for determining if a user of the wireless communication device accepts the determined adjustment action.

62. The wireless communication device of claim 42, further comprising:
a user action log stored in the memory operable for storing user actions and associated temporal information; and
wherein the function adjustment module further comprises:
usage pattern logic operable for determining a usage pattern based on the logged user actions and the temporal information; and
wherein the adjustment determination logic is further operable for determining the adjustment action further based on the usage pattern.

63. The wireless communication device of claim 62, wherein the user actions comprise at least one of a communication call made, a communication call received, an application accessed and a functionality implemented.

64. The wireless communication device of claim 62, further comprising a location determining device in communication with the processor and wherein the user action log further stores geographic location information associated with the user actions and wherein the usage pattern logic is further operable for determining a usage pattern based on the logged user actions, the temporal information and the geographic location information.

65. The wireless communication device of claim 62, further comprising one or more environmental sensing devices in communication with the process and wherein the user action log further stores one or more environmental conditions associated with a user action and wherein the usage pattern logic is further operable for determining a usage pattern based on the logged user actions, the temporal information and the environmental conditions.

66. The wireless communication device of claim 62, wherein the adjustment action is chosen from the group consisting of function parameter adjustment, function activation and function deactivation.

67. The wireless communication device of claim 62, wherein the adjustment determination logic further comprises a predetermined algorithm and wherein the adjustment action is based on the predetermined algorithm.

68. The wireless communication device of claim 62, wherein the adjustment logic is further operable adjusting, automatically, one or more functions associated with the usage pattern.

69. The wireless communication device of claim 68, wherein the adjustment logic is further operable for adjusting, automatically based on a user pre-configuration associated with the usage pattern.

70. The wireless communication device of claim 62, wherein the adjustment logic is further operable for proposing the one or more function adjustments to a device user for acceptance prior to adjusting the one or more functions.

71. A wireless communication device, comprising:
means for detecting one or more environmental conditions at the wireless communication device, wherein the one or more environmental conditions comprise wireless communication device motion;
means for determining if the one or more detected environmental conditions warrant adjustment to one or more wireless communication device functions, wherein the one or more wireless communication device functions comprise a voice-activated dialer function; and
means for determining an adjustment action for the one or more wireless device functions if the one or more detected environmental condition is determined to warrant adjustment.

72. The wireless communication device of claim 71, further comprising:
means for logging user actions and temporal information associated with the user actions;
means for determining a usage pattern based on the logged user actions and the temporal information;
wherein the means for determining the adjustment action further determines based on the usage pattern; and
means for adjusting the one or more wireless communication device functions based on the corresponding adjustment action.

73. The wireless communication device of claim 71, further comprising:
means for detecting one or more environmental conditions at a wireless communication device;
means for logging the one or more environmental conditions and associated temporal information;
means for determining an environmental condition pattern based on the logged environmental conditions and the associated temporal information; and
wherein the means for determining the adjustment action further determines based on the environmental condition pattern.

* * * * *